(12) United States Patent
Guenther

(10) Patent No.: US 7,661,910 B2
(45) Date of Patent: Feb. 16, 2010

(54) HYDRAULIC ELEVATION APPARATUS AND METHOD

(76) Inventor: Ross Guenther, 6408 Topaz Dr., Pollock Pines, CA (US) 95726

( * ) Notice: Subject to any disclaimer, the term of this patent is extended or adjusted under 35 U.S.C. 154(b) by 621 days.

(21) Appl. No.: 11/437,973

(22) Filed: May 18, 2006

(65) Prior Publication Data
US 2007/0269295 A1    Nov. 22, 2007

(51) Int. Cl.
   *B65G 53/10* (2006.01)
(52) U.S. Cl. .......................... 406/142; 406/141; 406/90
(58) Field of Classification Search ................... 406/86, 406/90, 133, 141, 142; 37/321
   See application file for complete search history.

(56) References Cited

U.S. PATENT DOCUMENTS

| | | | | |
|---|---|---|---|---|
| 3,232,672 A | * | 2/1966 | Gardner, Jr. ................. | 406/125 |
| 3,371,965 A | * | 3/1968 | Maclellan .................... | 406/125 |
| 3,485,534 A | * | 12/1969 | Frederick et al. ............. | 406/109 |
| 3,753,303 A | * | 8/1973 | Holzenberger et al. ........ | 37/309 |
| 3,982,789 A | * | 9/1976 | Funk ........................... | 406/105 |
| 4,114,954 A | * | 9/1978 | Pasieka et al. ................ | 406/93 |
| 4,154,484 A | * | 5/1979 | Holzenberger .............. | 406/106 |
| 4,247,229 A | | 1/1981 | Evans | |
| 6,178,670 B1 | * | 1/2001 | Susman et al. ................ | 37/313 |
| 6,860,042 B2 | * | 3/2005 | Hutchinson et al. ........... | 37/322 |

* cited by examiner

*Primary Examiner*—Douglas A Hess
(74) *Attorney, Agent, or Firm*—Pillsbury Winthrop Shaw Pittman LLP

(57) ABSTRACT

The hydraulic elevation apparatus and method of the present invention incorporate a multiple chamber framework internally disposed preferably within at least one single shaft structure, which facilitates movement of object transport containers within the multiple chamber framework. Preferably, fluid elevation is employed to elevate object transport containers and their contents within the multiple chamber framework. Each single shaft structure may be constructed from an existing rehabilitated shaft, or a newly drilled shaft. The present invention may be utilized in vertical or incline lifting environments, and an auxiliary hoist chamber may be incorporated into the multiple chamber framework for use as an alternative to, or in conjunction with, elevating objects by employing fluid elevation. The present invention may be employed in a variety of heavy lifting scenarios, including underground mining or in above ground lifting environments.

24 Claims, 10 Drawing Sheets

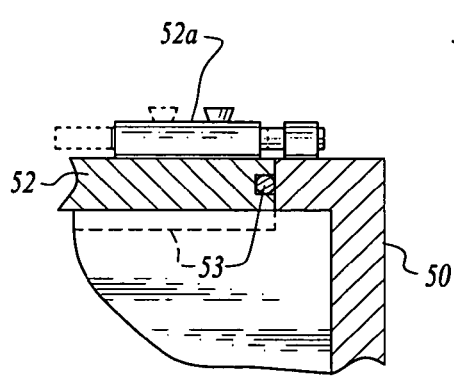
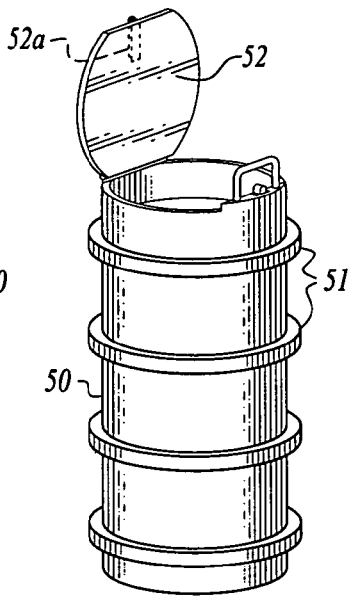
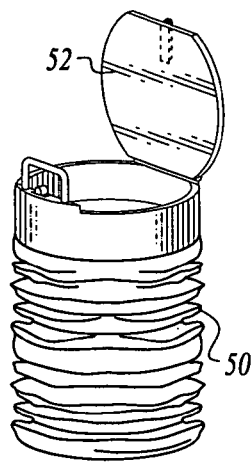
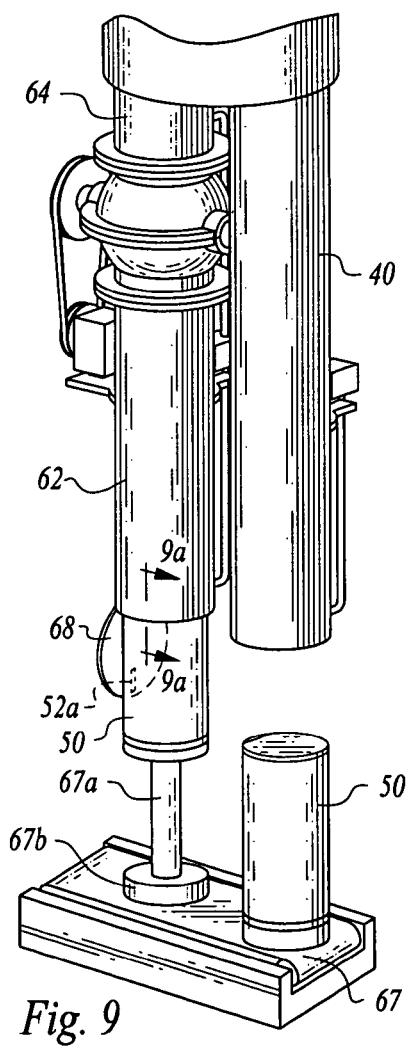
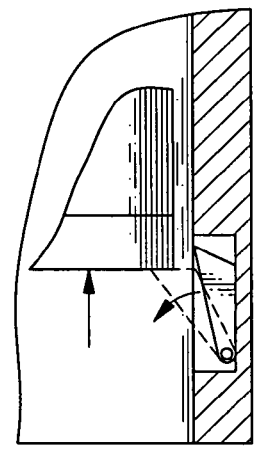
Fig. 3a
Fig. 3
Fig. 4
Fig. 9
Fig. 9a

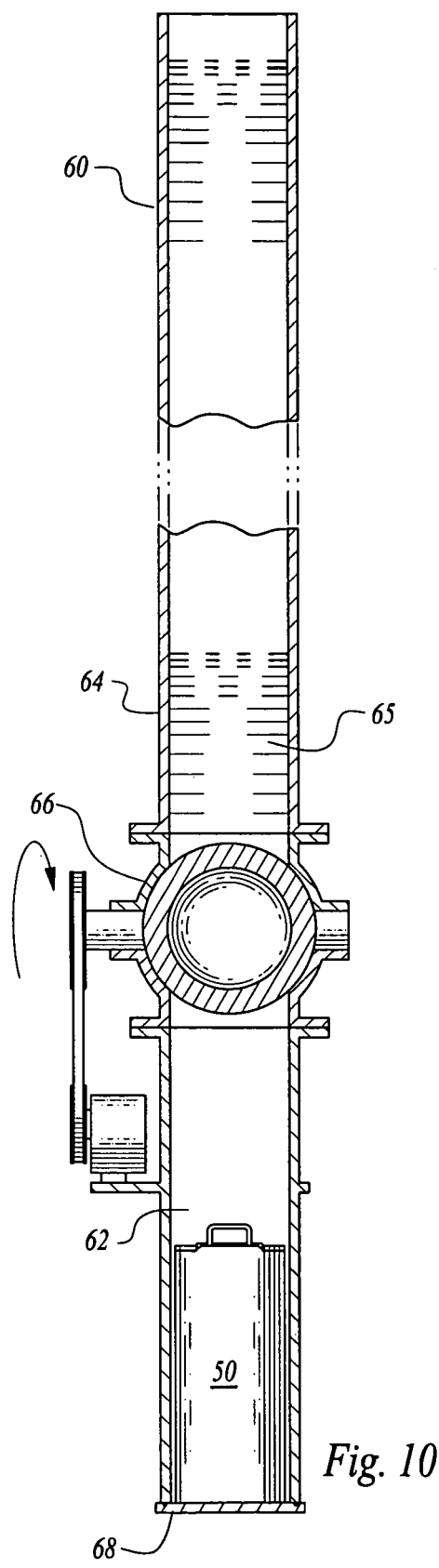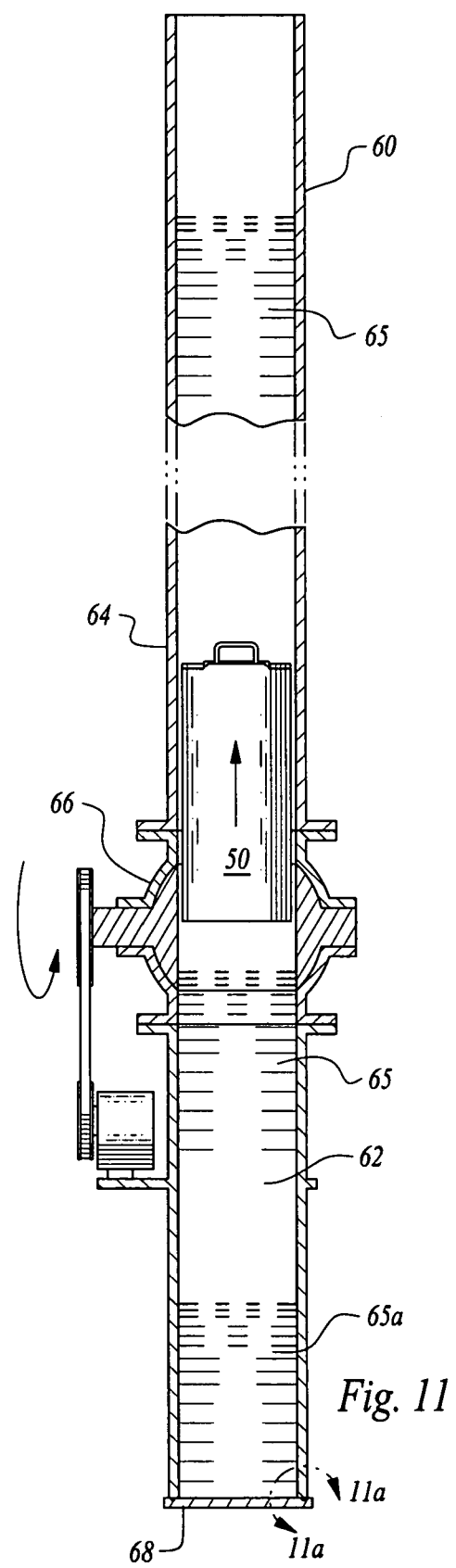
Fig. 10
Fig. 11

HYDRAULIC ELEVATION APPARATUS AND METHOD

BACKGROUND OF THE INVENTION

1. Field of the Invention

The present invention generally relates to an apparatus and method for lifting objects by flotation from beneath the earth's surface or from one elevation above the earth's surface to another elevation within at least one single shaft structure. More specifically, the present invention provides an apparatus and method for conveying objects within at least one multiple chamber single shaft structure positioned beneath the earth's surface or above the earth's surface and elevating objects within the shaft structure by employing fluid buoyancy.

2. Description of the Related Art

A persistent and formidable challenge in mining and related industries is implementing cost effective, efficient and reliable devices and methods for lifting objects either from beneath the earth's surface or to elevations above the earth's surface. For instance, currently within the underground mining industry, demonstrably inefficient and relatively costly methods and devices are employed to lift rock and other objects from subsurface levels to above the earth's surface. In vertical lifting environments, hoisting loads of objects by wire rope elevation is a frequently employed method of removing those objects from beneath the earth's surface. However, hoisting materials either individually or by load in existing vertical shafts is often inordinately space consuming, time consuming, costly, and consequently inefficient. Vertical shaft hoisting generally requires an entire shaft compartment to lift a single load contained in a bucket or similar container, and additionally requires considerable time to lower the container back down the same shaft compartment to complete the hoisting cycle of a single container. Moreover, vertical shaft hoist lifting devices and methods require the use of relatively expensive equipment, including hoists, wire rope, and corresponding mechanical parts, which are not only high maintenance, but also demand frequent replacement as a consequence of normal wear and tear. In high frequency or high load density mining conditions, repair and replacement costs often increase exponentially. The relatively high costs of energy required to operate vertical hoist shafts are largely a function of load density, and the attendant amount of energy required to offset the friction of various moving parts required to elevate each load of materials.

Existing methods for lifting objects within shafts positioned at an incline either beneath or above the earth's surface involve shortcomings similar to those previously identified with respect to vertical lifting environments. For instance, conveyors, trams, trucks and other such haulage equipment are commonly employed to incline lift objects within multiple shaft structures. Such incline lifting equipment often requires even more moving parts and mechanical operation in comparison to vertical hoisting equipment, and often includes significant manual labor efforts to complete each mining cycle.

Apparent attempts to alleviate some of the disadvantages associated with existing vertical and incline lifting technologies have resulted in devices and methods embodying similarly disadvantageous characteristics, and in some instances substantially more problematic operational components. U.S. Pat. No. 4,247,229 to Evans represents one such attempt. The Evans patent discloses an underground mining method and apparatus employing at least two separate downwardly descending shafts connected by at least one lateral opening incorporating a series of conveyors and moveable doors to facilitate container movement underground. One shaft is required to receive an ore carrier, which passes through a moveable door opening into a compartment for loading, and through a second moveable door opening into the second shaft. The second shaft is required to elevate the loaded ore carrier to the earth's surface. The apparent structural, operational and economic demands of employing two or more separate shafts to complete a mining cycle are most likely significant. Ostensibly, not only must at least two separate shafts be drilled or existing parallel shafts located and rehabilitated, but each shaft must be linked by the elaborate lateral opening connecting the multiple shafts, which presumably incorporates expensive equipment and corresponding maintenance and repair.

Thus, a need exists for a lifting apparatus and method capable of elevating animate and inanimate objects from beneath the earth's surface or from one elevation above the earth's surface to another elevation preferably within a single shaft structure employing fluid to elevate containers and corresponding objects.

SUMMARY OF THE INVENTION

The hydraulic elevation apparatus and method of the present invention overcome the functional and operational limitations currently prevalent in existing heavy lifting equipment, which confound conventional lifting techniques and impede operational efficiency, including with respect to underground mining and above ground lifting environments. The hydraulic elevation apparatus and method of the present invention may be employed preferably within at least one single shaft structure, which may be constructed from an existing rehabilitated shaft or a newly drilled shaft positioned beneath or above the earth's surface.

The present invention incorporates a chamber framework internally disposed preferably within at least one single shaft structure, which facilitates movement of an object transport container within the chamber framework to remove objects from, or deliver objects to, locations beneath or above the earth's surface. The chamber framework may incorporate a tripartite, dual, or otherwise multiple cavity structure.

In a first embodiment of the present invention, the hydraulic elevation apparatus is used in a vertical lifting environment which may be either below ground or above ground. The chamber framework internally disposed within a single shaft structure includes a tripartite cavity structure, which incorporates a vertically positioned cavity creating a return chamber, a vertically positioned cavity creating a delivery chamber, and a vertically positioned cavity creating an auxiliary hoist chamber. The return and auxiliary hoist chambers are laterally positioned on either side of the delivery chamber. Empty, collapsed or filled transport containers may be lowered within the return chamber via a wire rope hoist or similar device. In the auxiliary hoist chamber, multiple empty transport containers may be returned simultaneously in one hoisting cycle by employing collapsible, stacked, or tapered containers fitting inside each other.

The lower section of the return chamber is operatively positioned with respect to a transport channel and storage bin containing ore or other objects. The transport channel facilitates transport container loading while the transport container remains within the return chamber. The transport container may be removed from the return chamber for loading, and subsequently placed back into the return chamber for further transport.

The delivery chamber laterally positioned adjacent to the return chamber includes a lower chamber section and an upper chamber section, between which a fluid control valve is operatively positioned. The lower chamber section of the delivery chamber includes a lower chamber hatch, which is remotely opened and closed to facilitate entry and retention of the transport container within the return chamber. The upper chamber section of the return chamber contains a fluid, such as water, which is permitted controlled entry into the lower chamber section to facilitate elevating the container from within the lower chamber section, through the upper chamber section, and eventually to the top of the delivery chamber for removal. The fluid control valve positioned within the delivery chamber controls fluid flow from the upper chamber section into the lower chamber section of the delivery chamber.

The auxiliary hoist chamber positioned adjacent to the delivery chamber includes a transport container operatively connected to a pulley mechanism or other surface hoist device, and facilitates lifting the transport container within the chamber framework without employing fluid elevation. The auxiliary hoist chamber may be employed as an alternative, or in addition to, elevating objects by employing fluid elevation.

A second embodiment of the apparatus of the present invention, which may be positioned either below ground or above ground, employs a dual cavity structure within the internally disposed chamber framework, which includes a return chamber and delivery chamber. The dual cavity structure includes a return chamber wherein transport containers may be lowered within the chamber framework via wire rope hoist, pulley, or other such movement mechanisms. Transport containers may be loaded or unloaded while the transport container remains within the return chamber, or by removing and replacing the transport container for loading or unloading. Transport containers are then guided to and placed within the delivery chamber for elevation within the chamber framework.

In third and fourth embodiments of the present invention, the hydraulic elevation apparatus is used in an incline lifting environment, which may be either below ground or above ground. At least one shaft structure is positioned at an incline either beneath or above the earth's surface. The chosen incline angle of the shaft structure may vary depending upon any number of relevant factors, such as the external environmental or subsurface conditions existing at the site of lifting, the size, shape and weight of objects being moved within the chamber framework, and other such factors that may influence the desired angle of an incline angled shaft.

In a third embodiment, the chamber framework internally disposed within the inclined single shaft structure includes a dual cavity structure, which incorporates a cavity creating a return chamber, and a cavity creating a delivery chamber positioned adjacent to the return chamber. The return chamber may optionally contain a ventilation channel to provide a source of circulated air as the transport container descends within the return chamber. As previously described, a transport channel and an object storage bin may be operatively positioned in relation to the lower section of the return chamber, and objects such as ore may be funneled from the storage bin through the transport channel and into the transport container while the transport container remains within, or in close communication with, the return chamber. Alternatively, the transport container may be removed from the return chamber for loading, and subsequently replaced within the return chamber for further transport.

In an incline lifting scenario, the transport container may include an internal partition, which maintains transported objects along the lower longitudinal portion of the transport container during transport, and diminishes contact between the outside of the transport container and the inside of the delivery chamber walls as the transport container and its contents are lifted within the delivery chamber. As previously described, once loaded, the transport container is guided into and secured within the lower chamber section of the delivery chamber. The fluid control valve is positioned between the lower chamber section and upper chamber section of the delivery chamber, and controls fluid entry into the lower chamber section, which facilitates elevating the transport container within the chamber framework.

In a fourth embodiment of the present invention, the hydraulic elevation apparatus includes a tripartite cavity structure, which incorporates a return chamber, delivery chamber, and an optional auxiliary hoist chamber as discussed above.

A dual, tripartite, or otherwise multiple chamber framework may be employed in the embodiments described above.

The functional aspects of the present invention promote operational and cost efficiency in heavy lifting environments, including underground mining and above ground lifting scenarios. The apparatus and method of the present invention may be employed within an existing rehabilitated or newly drilled single shaft structure. The apparatus and method of the present invention may be employed in multiple shaft structures to increase operational capacity at any given site of operation.

The present invention also includes a method of lifting objects by flotation employing the apparatus of the invention. The steps of the method are described below.

The method of the present invention may be employed to deliver or remove objects either within or above the earth's surface. A loaded, empty or collapsed transport container is deposited into the return chamber and descends within the return chamber into the lower chamber section of the return chamber. Preferably, transport containers are lowered within the return chamber via a hoist, pulley, or other such mechanism. The transport container may then be emptied or loaded by removing the transport container from the return chamber for appropriate handling. Alternatively, the transport container may be loaded with objects such as ore by engaging the transport container with a transport channel attached to an object storage bin as discussed above, and funneling objects from the storage bin through the transport channel and into the transport container, which is positioned within the return chamber. The transport container is then sealed and guided laterally from the return chamber to the delivery chamber by a guiding device, such as a ram, adjustable latch or other mechanical attachment device.

Once the transport container is guided into and secured within the lower chamber section of the delivery chamber and the lower chamber hatch is sealed, the fluid control valve is adjusted to permit fluid from the upper chamber section of the delivery chamber to flow into the lower chamber section. As fluid enters the lower chamber section of the delivery chamber, the transport container floats upward within the delivery chamber. When the transport container floats up past the fluid control valve, the fluid control valve is adjusted to stop water flow into the lower chamber section. The transport container subsequently floats to the top of the delivery chamber, and may be connected to a pulley or similar shuttle tram to remove the transport container from the delivery chamber, and guide the transport container to a stockpile or other designated location for unloading. The transport container may then be reintroduced into the return chamber for another cycle of transport.

OBJECTS OF THE INVENTION

It is a primary object of the present invention to provide a new and novel hydraulic elevation apparatus, which may be employed preferably within at least one single shaft structure.

It is a further object of the present invention to provide a corresponding method that compliments the inventive hydraulic elevation apparatus.

It is a further object of the present invention to provide an apparatus and method as delineated herein, which are relatively easy to construct and employ, lend themselves to heavy lifting techniques and environments, and can be utilized with a relatively high degree of efficiency and a relatively low degree of operational and functional maintenance.

It is a further object of the present invention to provide an apparatus and method as characterized above, which employ a multiple chamber framework to transport objects beneath or above the earth's surface, and fluid elevation to lift the objects within the multiple chamber framework.

Viewed from a first vantage point, it is an object of the present invention to provide an apparatus for transporting animate or inanimate objects employing flotation elevation comprising at least one single shaft structure; a transport container; and conveying means internally disposed within said at least one single shaft structure for conveying said transport container within said at least one single shaft structure and elevating said transport container by flotation.

Viewed from a second vantage point, it is an object of the present invention to provide an apparatus for transporting animate or inanimate objects employing flotation elevation comprising at least one single shaft structure; a transport container; and conveying means internally disposed within said at least one single shaft structure for conveying said transport container within said at least one single shaft structure and elevating said transport container by flotation, wherein said conveying means comprises a return means for introducing said transport container into said at least one single shaft structure, a loading means for loading objects into said transport container, and a delivery means for elevating said transport container by applying fluid to elevate said transport container within said delivery means.

Viewed from a third vantage point, it is an object of the present invention to provide an apparatus for transporting animate or inanimate objects employing flotation elevation comprising at least one single shaft structure; a transport container; and conveying means internally disposed within said at least one single shaft structure for conveying said transport container within said at least one single shaft structure and elevating said transport container by flotation, wherein said conveying means comprises a return means for introducing said transport container into said at least one single shaft structure, a loading means for loading objects into said transport container, and a delivery means for elevating said transport container by applying fluid to elevate said transport container within said delivery means, wherein said return means comprises a vertically disposed cavity within said at least one single shaft structure through which said transport container descends in order to deliver or retrieve objects.

Viewed from a fourth vantage point, it is an object of the present invention to provide an apparatus for transporting animate or inanimate objects employing flotation elevation comprising at least one single shaft structure; a transport container; and conveying means internally disposed within said at least one single shaft structure for conveying said transport container within said at least one single shaft structure and elevating said transport container by flotation, wherein said conveying means comprises a return means for introducing said transport container into said at least one single shaft structure, a loading means for loading objects into said transport container, and a delivery means for elevating said transport container by applying fluid to elevate said transport container within said delivery means, wherein said loading means is operatively engaged with said return means and comprises an object storage means and channel means in operative communication with said return means such that objects are transferred from said storage means through said channel means into said transport container.

Viewed from a fifth vantage point, it is an object of the present invention to provide an apparatus for transporting animate or inanimate objects employing flotation elevation comprising at least one single shaft structure; a transport container; and conveying means internally disposed within said at least one single shaft structure for conveying said transport container within said at least one single shaft structure and elevating said transport container by flotation, wherein said conveying means comprises a return means for introducing said transport container into said at least one single shaft structure, a loading means for loading objects into said transport container, and a delivery means for elevating said transport container by applying fluid to elevate said transport container within said delivery means, wherein said delivery means comprises a cavity means laterally disposed to said return means within said at least one single shaft structure, and wherein said delivery means receives said transport container from said return means and wherein said delivery means is equipped to facilitate elevation of said transport container by flotation within said delivery means.

Viewed from a sixth vantage point, it is an object of the present invention to provide an apparatus for transporting animate or inanimate objects employing flotation elevation comprising at least one single shaft structure; a transport container; and conveying means internally disposed within said at least one single shaft structure for conveying said transport container within said at least one single shaft structure and elevating said transport container by flotation, wherein said conveying means comprises a return means for introducing said transport container into said at least one single shaft structure, a loading means for loading objects into said transport container, and a delivery means for elevating said transport container by applying fluid to elevate said transport container within said delivery means, wherein said delivery means comprises a cavity means laterally disposed to said return mean within said at least one single shaft structure, and wherein said delivery means receives said transport container from said return means and wherein said delivery means is equipped to facilitate elevation of said transport container by flotation within said delivery means, wherein said delivery means further comprises a fluid control means for controlling the amount of fluid engaging said transport container in order to elevate said transport container within said delivery means of said at least one single shaft structure.

Viewed from a seventh vantage point, it is an object of the present invention to provide an apparatus for transporting animate or inanimate objects employing flotation elevation comprising at least one single shaft structure; a transport container; and conveying means internally disposed within said at least one single shaft structure for conveying said transport container within said at least one single shaft structure and elevating said transport container by flotation, wherein said conveying means comprises a return means for introducing said transport container into said at least one single shaft structure, a loading means for loading objects into said transport container; and a delivery means for elevating said transport container by applying fluid to elevate said transport container within said delivery means, wherein said transport container comprises a moveable lid means to allow for loading or unloading said transport container, and for sealing said transport container.

Viewed from an eighth vantage point, it is an object of the present invention to provide an apparatus for transporting animate or inanimate objects employing flotation elevation comprising a single shaft structure; a transport container; a conveying means internally disposed within said single shaft structure for conveying said transport container within said single shaft structure; and fluid control means internally disposed within said conveying means for controlling the volume of fluid within said single shaft structure to elevate objects contained in said transport container.

Viewed from a ninth vantage point, it is an object of the present invention to provide an apparatus for transporting animate or inanimate objects employing flotation elevation comprising a single shaft structure; a transport container; a conveying means internally disposed within said single shaft structure for conveying said transport container within said single shaft structure; and fluid control means internally disposed within said conveying means for controlling the volume of fluid within said single shaft structure to elevate objects contained in said transport container, wherein said conveying means comprises a return chamber means for introducing said transport container within said single shaft structure, a loading means for loading objects into said transport container, a guiding means for guiding said transport container within said conveying means, and a delivery chamber means for elevating said transport container, and wherein said fluid control means is operatively attached to said delivery chamber means.

Viewed from a tenth vantage point, it is an object of the present invention to provide an apparatus for transporting animate or inanimate objects employing flotation elevation comprising a single shaft structure; a transport container; a conveying means internally disposed within said single shaft structure for conveying said transport container within said single shaft structure; and fluid control means internally disposed within said conveying means for controlling the volume of fluid within said single shaft structure to elevate objects contained in said transport container, wherein said conveying means comprises a return chamber means for introducing said transport container within said single shaft structure, a loading means for loading objects into said transport container, a guiding means for guiding said transport container within said conveying means, and a delivery chamber means for elevating said transport container, and wherein said fluid control means is operatively attached to said delivery chamber means, wherein said guiding means is horizontally disposed within a bottom portion of said conveying means in operative communication with said return chamber means, said transport container, and said delivery chamber means, and whereby said guiding means operatively attaches to said transport container and laterally moves said transport container into operative communication with said delivery chamber means.

Viewed from an eleventh vantage point, it is an object of the present invention to provide an apparatus for transporting animate or inanimate objects employing flotation elevation comprising a single shaft structure; a transport container; a conveying means internally disposed within said single shaft structure for conveying said transport container within said single shaft structure; and fluid control means internally disposed within said conveying means for controlling the volume of fluid within said single shaft structure to elevate objects contained in said transport container, wherein said conveying means comprises a return chamber means for introducing said transport container within said single shaft structure, a loading means for loading objects into said transport container, a guiding means for guiding said transport container within said conveying means, and a delivery chamber means for elevating said transport container, and wherein said fluid control means is operatively attached to said delivery chamber means, wherein said fluid control means comprises a lower chamber section means internally disposed within said delivery chamber means for engaging said transport container prior to elevation of said transport container, and valve means for controlling the amount of fluid that enters into said lower chamber means to contact said transport container and elevate said transport container within said delivery chamber.

Viewed from a twelfth vantage point, it is an object of the present invention to provide an apparatus for transporting animate or inanimate objects employing flotation elevation comprising at least one single shaft structure; a chamber framework internally disposed within said at least one single shaft structure; a fluid control means internally disposed within said chamber framework; and a transport container.

Viewed from a thirteenth vantage point, it is an object of the present invention to provide an apparatus for transporting animate or inanimate objects employing flotation elevation comprising at least one single shaft structure; a chamber framework internally disposed within said at least one single shaft structure; a fluid control means internally disposed within said chamber framework; and a transport container, wherein said chamber framework comprises a return chamber for introducing said transport container within said single shaft structure, and a laterally disposed delivery chamber for elevating said transport container from within said single shaft structure.

Viewed from a fourteenth vantage point, it is an object of the present invention to provide an apparatus for transporting animate or inanimate objects employing flotation elevation comprising at least one single shaft structure; a chamber framework internally disposed within said at least one single shaft structure; a fluid control means internally disposed within said chamber framework; and a transport container, wherein said chamber framework comprises a return chamber for introducing said transport container within said single shaft structure, and a laterally disposed delivery chamber for elevating said transport container from within said single shaft structure, wherein said return chamber comprises controlling means for adjusting the speed at which said transport container descends within said return chamber, wherein said return chamber is operatively engaged with means for introducing objects into said transport container while said transport container is within said return chamber, and wherein said return chamber is operatively engaged with means for guiding said transport container into operative contact with said delivery chamber.

Viewed from a fifteenth vantage point, it is an object of the present invention to provide an apparatus for transporting animate or inanimate objects employing flotation elevation comprising at least one single shaft structure; a chamber framework internally disposed within said at least one single shaft structure; a fluid control means internally disposed within said chamber framework; and a transport container, wherein said chamber framework comprises a return chamber for introducing said transport container within said single shaft structure, and a laterally disposed delivery chamber for elevating said transport container from within said single shaft structure, wherein said return chamber comprises controlling means for adjusting the speed at which said transport container descends within said return chamber, wherein said return chamber is operatively engaged with means for introducing objects into said transport container while said transport container is within said return chamber, and wherein said return chamber is operatively engaged with means for guiding said transport container into operative contact with said delivery chamber, wherein said delivery chamber comprises means for securely engaging said transport container after said transport container is guided into operative communication with said delivery chamber, and means for controlling the amount of fluid engaging said transport container within said delivery chamber to achieve sufficient buoyancy to float said transport container upward within said delivery chamber.

Viewed from a sixteenth vantage point, it is an object of the present invention to provide an apparatus for transporting animate or inanimate objects employing flotation elevation comprising at least one single shaft structure; a chamber framework internally disposed within said at least one single shaft structure; a fluid control means internally disposed within said chamber framework; and a transport container, wherein said chamber framework comprises a return chamber for introducing said transport container within said single shaft structure, and a laterally disposed delivery chamber for elevating said transport container from within said single shaft structure, further comprising an auxiliary chamber means laterally disposed to said delivery chamber or said return chamber for transporting objects within said at least one single shaft structure by hoisting.

Viewed from a seventeenth vantage point, it is an object of the present invention to provide an apparatus for transporting animate or inanimate objects employing flotation elevation comprising a single shaft structure; a chamber framework internally disposed within said single shaft structure comprising a return chamber, a laterally disposed delivery chamber and an auxiliary chamber laterally positioned to said delivery chamber; a transport container; an object storage bin connected to an object transport channel in operative communication with said return chamber, whereby objects are transferred from said storage bin through said transport channel into said transport container while said transport container is positioned within said return chamber; and a fluid control valve in operative communication with said delivery chamber to control the amount of fluid that engages said transport container to elevate said transport container within said delivery chamber.

Viewed from an eighteenth vantage point, it is an object of the present invention to provide a method of transporting animate or inanimate objects employing flotation elevation, comprising (A) depositing a transport container within a return chamber internally disposed within a single shaft structure; (B) loading or unloading said transport container; (C) guiding said transport container into a delivery chamber internally disposed within said single shaft structure; and (D) introducing fluid into a lower chamber section of said delivery chamber to elevate said transport container within said delivery chamber.

Viewed from a nineteenth vantage point, it is an object of the present invention to provide a method of transporting animate or inanimate objects employing flotation elevation, comprising (A) depositing a transport container within a return chamber internally disposed within a single shaft structure; (B) loading or unloading said transport container; (C) guiding said transport container into a delivery chamber internally disposed within said single shaft structure; and (D) introducing fluid into a lower chamber section of said delivery chamber to elevate said transport container within said delivery chamber, also including in step (B) loading or unloading said transport container within said return chamber by transferring objects from or to an externally disposed object container through a transport channel into or out of said transport container.

Viewed from a twentieth vantage point, it is an object of the present invention to provide a method of transporting animate or inanimate objects employing flotation elevation, comprising (A) depositing a transport container within a return chamber internally disposed within a single shaft structure; (B) loading or unloading said transport container; (C) guiding said transport container into a delivery chamber internally disposed within said single shaft structure; and (D) introducing fluid into a lower chamber section of said delivery chamber to elevate said transport container within said delivery chamber, also including in step (B) removing said transport container from within said return chamber, loading or unloading said transport container, and replacing said transport container into said return chamber.

Viewed from a twenty-first vantage point, it is an object of the present invention to provide a method of transporting animate or inanimate objects employing flotation elevation, comprising (A) depositing a transport container within a return chamber internally disposed within a single shaft structure; (B) loading or unloading said transport container; (C) guiding said transport container into a delivery chamber internally disposed within said single shaft structure; and (D) introducing fluid into a lower chamber section of said delivery chamber to elevate said transport container within said delivery chamber, also including in step (C) operatively connecting said transport container to a laterally mobile conveyor and directing said conveyor to move said transport container into operative communication with said delivery chamber.

Viewed from a twenty-second vantage point, it is an object of the present invention to provide a method of transporting animate or inanimate objects employing flotation elevation, comprising (A) depositing a transport container within a return chamber internally disposed within a single shaft structure; (B) loading or unloading said transport container; (C) guiding said transport container into a delivery chamber internally disposed within said single shaft structure; and (D) introducing fluid into a lower chamber section of said delivery chamber to elevate said transport container within said delivery chamber, also including in step (D) adjusting a valve operatively connected to said delivery chamber to introduce fluid into said lower chamber section of said delivery chamber in a sufficient amount to elevate said transport container above said valve, and adjusting said valve to terminate fluid flow into said lower chamber section of said delivery chamber after said transport container floats above said valve.

Viewed from a twenty-third vantage point, it is an object of the present invention to provide a method for transporting animate or inanimate objects employing flotation elevation, comprising (A) depositing a transport container into a first chamber of a multiple chamber framework internally disposed within at least one single shaft structure; (B) loading or unloading said transport container; and (C) introducing said transport container into a second chamber of said multiple chamber framework to elevate said transport container by flotation within said second chamber.

Viewed from a twenty-fourth vantage point, it is an object of the present invention to provide a method for transporting animate or inanimate objects employing flotation elevation, comprising (A) depositing a transport container into a first chamber of a multiple chamber framework internally disposed within at least one single shaft structure; (B) loading or unloading said transport container; and (C) introducing said transport container into a second chamber of said multiple chamber framework to elevate said transport container by flotation within said second chamber, wherein the step of depositing said transport container into said first chamber further includes controlling the speed at which said transport container descends within said first chamber.

Viewed from a twenty-fifth vantage point, it is an object of the present invention to provide a method for transporting animate or inanimate objects employing flotation elevation, comprising (A) depositing a transport container into a first chamber of a multiple chamber framework internally disposed within at least one single shaft structure; (B) loading or unloading said transport container; and (C) introducing said transport container into a second chamber of said multiple chamber framework to elevate said transport container by flotation within said second chamber, wherein the step of loading or unloading said transport container further includes introducing objects into or removing objects out of said transport container while said transport container remains within said first chamber.

Viewed from a twenty-sixth vantage point, it is an object of the present invention to provide a method for transporting animate or inanimate objects employing flotation elevation, comprising (A) depositing a transport container into a first chamber of a multiple chamber framework internally disposed within at least one single shaft structure; (B) loading or unloading said transport container; and (C) introducing said transport container into a second chamber of said multiple chamber framework to elevate said transport container by flotation within said second chamber, wherein the step of introducing said transport container into said second chamber further includes adjusting the amount of fluid within said second chamber to facilitate floatation.

Viewed from a twenty-seventh vantage point, it is an object of the present invention to provide a method for transporting animate or inanimate objects employing flotation elevation, comprising (A) depositing a transport container into a first chamber of a multiple chamber framework internally disposed within at least one single shaft structure; (B) loading or unloading said transport container; and (C) introducing said transport container into a second chamber of said multiple chamber framework to elevate said transport container by flotation within said second chamber, wherein the step of loading or unloading said transport container further includes removing said transport container from said first chamber, loading or unloading objects, and replacing said transport container into said first chamber for further transport.

Viewed from a twenty-eighth vantage point, it is an object of the present invention to provide a method for transporting animate or inanimate objects employing flotation elevation, comprising (A) depositing a transport container into a multiple chamber framework internally disposed within at least one single shaft structure; (B) loading or unloading said transport container; and (C) elevating said transport container upward within said multiple chamber framework.

Viewed from a twenty-ninth vantage point, it is an object of the present invention to provide a method for transporting animate or inanimate objects employing flotation elevation, comprising (A) depositing a transport container into a multiple chamber framework internally disposed within at least one single shaft structure; (B) loading or unloading said transport container; and (C) elevating said transport container upward within said multiple chamber framework, wherein the step of elevating said transport container within said multiple chamber framework further comprises employing fluid elevation to elevate said transport container within said multiple chamber framework.

Viewed from a thirtieth vantage point, it is an object of the present invention to provide a method for transporting animate or inanimate objects employing flotation elevation, comprising (A) depositing a transport container into a multiple chamber framework internally disposed within at least one single shaft structure; (B) loading or unloading said transport container; and (C) elevating said transport container upward within said multiple chamber framework, wherein the step of elevating said transport container within said multiple chamber framework further comprises employing a hoisting device to elevate said transport container within said multiple chamber framework.

BRIEF DESCRIPTION OF THE DRAWINGS

FIG. 3 depicts a perspective view of a transport container of the apparatus of the present invention.

FIG. 3a depicts a side view of a hatch and seal of the apparatus of the present invention.

FIG. 4 depicts a perspective view of a transport container of the apparatus of the present invention in a collapsible form.

FIG. 9 depicts placement of a transport container into a delivery chamber for flotation according to the apparatus of the present invention.

FIG. 9a depicts a chamber lock according to the apparatus of the present invention.

FIG. 10 depicts a front full cross-section of a delivery chamber, showing a valve in a closed position, water in an upper chamber section, and a transport container in a lower chamber section, according to the apparatus of the present invention.

FIG. 11 depicts a front full cross-section of a delivery chamber, showing a valve in an opened position, water in a lower chamber section, and a transport container floating upward above a valve, according to the apparatus of the present invention.

FIG. 14a depicts a cross-section of the apparatus of the present invention showing a diesel truck at the lower right.

FIG. 17 depicts a side view of the third embodiment of the apparatus of the present invention in an angled above-ground orientation employing a haulage vehicle to transport containers within a chamber.

DETAILED DESCRIPTION OF THE PREFERRED EMBODIMENTS

Elevation apparatus (10) of the present invention employs fluid to elevate animate or inanimate objects from beneath the earth's surface or from one elevation above the earth's surface to another elevation within preferably at least one single shaft elevation structure (20), which may be positioned downward into the earth's interior, or positioned above the earth's surface. Shaft elevation structure (20) incorporates an internally disposed chamber framework (30) by which objects are transported within shaft elevation structure (20). Shaft elevation structure (20) is typically a single shaft structure, but may consist of multiple shaft structures incorporating chamber framework (30). Chamber framework (30) may be constructed within shaft elevation structure (20) by various shaft rehabilitation techniques, and may be incorporated into existing shaft structures. Chamber framework (30) may alternatively be constructed within newly drilled shaft structures.

Figures 1, 2:
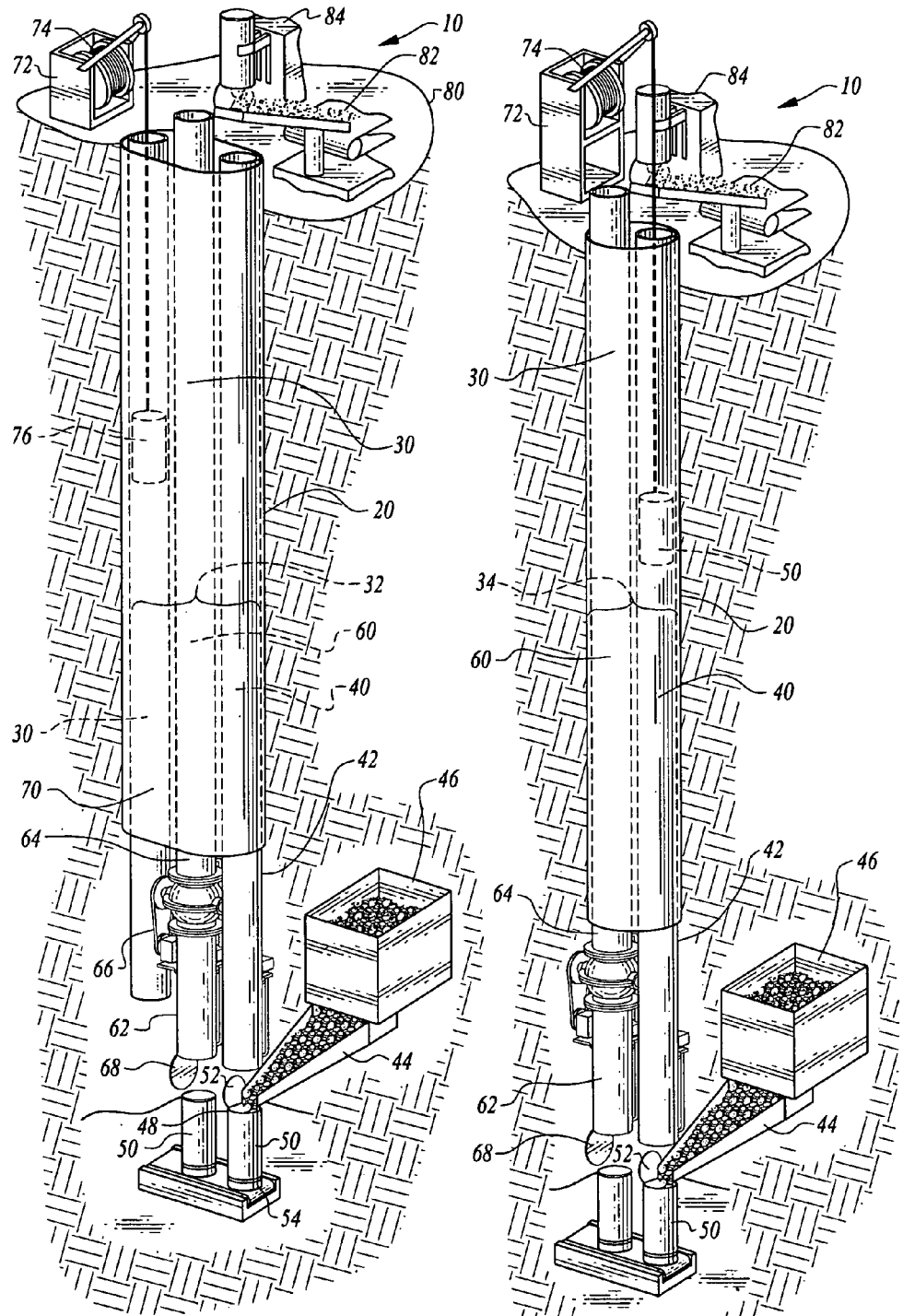
FIG. 1 depicts a perspective view of the first embodiment of the apparatus of the present invention showing a multiple chamber single shaft structure including a tripartite cavity structure with an auxiliary hoist chamber.
FIG. 2 depicts a perspective view of the second embodiment of the apparatus of the present invention showing a multiple chamber shaft structure including a dual cavity structure.

FIGS. 1 and 2 depict preferred embodiments of elevation apparatus (10) in a vertical lifting orientation. FIG. 1 shows the first embodiment of elevation apparatus (10) employing a chamber framework (30) comprising a tripartite cavity structure (32) positioned within shaft elevation structure (20). Tripartite cavity structure (32) of chamber framework (30) includes a return chamber (40), a transport container (50), a delivery chamber (60), and an auxiliary hoist chamber (70). Auxiliary hoist chamber (70) may be optionally positioned laterally and adjacent to delivery chamber (60). A surface hoist (72) comprising a pulley mechanism (74) and an operatively attached transport container (76) is employed within auxiliary hoist chamber (70) as an optional lifting mechanism to transport objects within chamber framework (30).

FIG. 2 shows the second embodiment of the elevation apparatus (10) employing a chamber framework (30) comprising a dual cavity structure (34) positioned within shaft elevation structure (20). Dual cavity structure (34) of chamber framework (30) includes a return chamber (40), a transport container (50), and a delivery chamber (60). As depicted in FIG. 2, transport container (50) may be lowered within return chamber (40) via a hoist, pulley, or similar such mechanism. Return chamber (40) includes a lower section (42), operatively positioned in relation to a transport channel (44). The outwardly extended top portion of transport channel (44) is connected to bin (46), which stores material to be elevated within chamber framework (30). Transport channel (44) is operatively positioned to engage transport container (50), which travels within return chamber (40) and delivery chamber (60) as described below.

As shown in FIGS. 3-4, transport container (50) is constructed with a top end hatch (52) and a bottom end hatch (not shown). Transport container (50) may be rectangular or cylindrical in shape, constructed in a collapsible form (FIG. 4), or otherwise suitably fitted to facilitate vertical or horizontal movement within chamber framework (30). Transport container (50) may be constructed from an array of durable materials conducive to airtight sealing and elevation by flotation, including plastic, synthetic polymers, polymer blends and the like, and metals, all characterized by imperviousness to rugged use and inert both to the materials being transported and its environs. Transport container (50) may include reinforcing ribs (51) interiorly and/or exteriorly disposed. Where transport container (50) is configured to be flexible, it is contemplated to compress parallel to its long axis but may compress transverse thereto. Durable elastomers, preferably reinforced with fiber characterized by resistance to chafe and distention include, by way of example, but not limitation: kevlar, boron graphite, fiberglass coated with rubber, neoprene, hypalon, and pvc.

FIG. 3a shows a sealable hatch which may be employed in conjunction with transport container (50). The top end hatch (52) and bottom end hatch (not shown) are constructed to open and close in order to modulate the contents of transport container (50) during use. As depicted in FIGS. 1 and 2, when top end hatch (52) is in an opened position, transport channel (44) operatively engages transport container (50) and funnels objects from bin (46) into transport container (50). As depicted in FIG. 3a, when top end hatch (52) is closed, seal (53) peripherally circumscribes the interface of top end hatch (52) and transport container (50) promulgates buoyancy. Seal (53) can be disposed on either interface surface of top end hatch (52) or transport container (50). In some instances, more than one seal is desired as a function of the pressure differential in and out of transport container (50).

Figure 5:
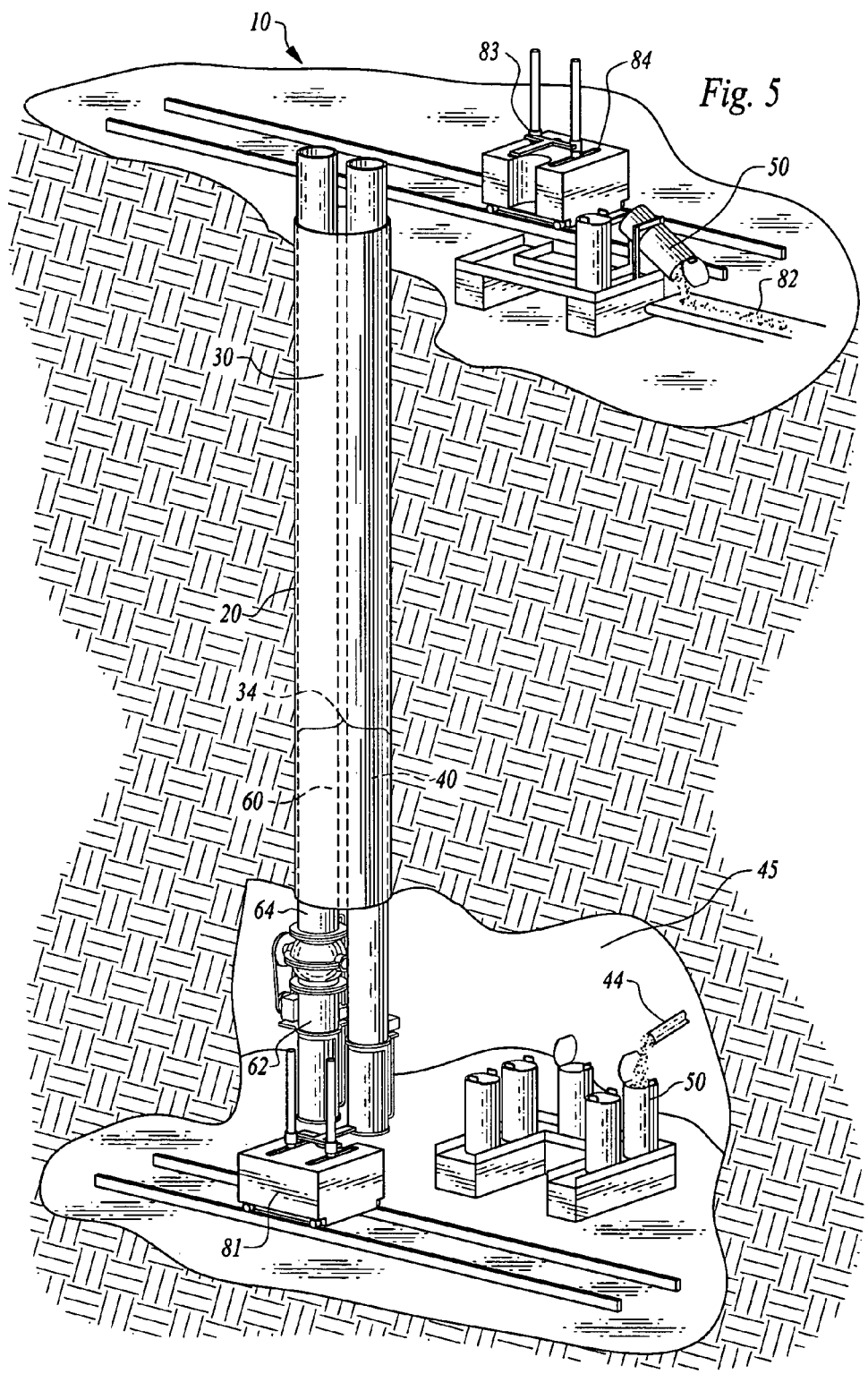
FIG. 5 depicts a perspective view of the apparatus of the present invention showing a multiple chamber single shaft structure including a dual cavity structure.
Figure 6:
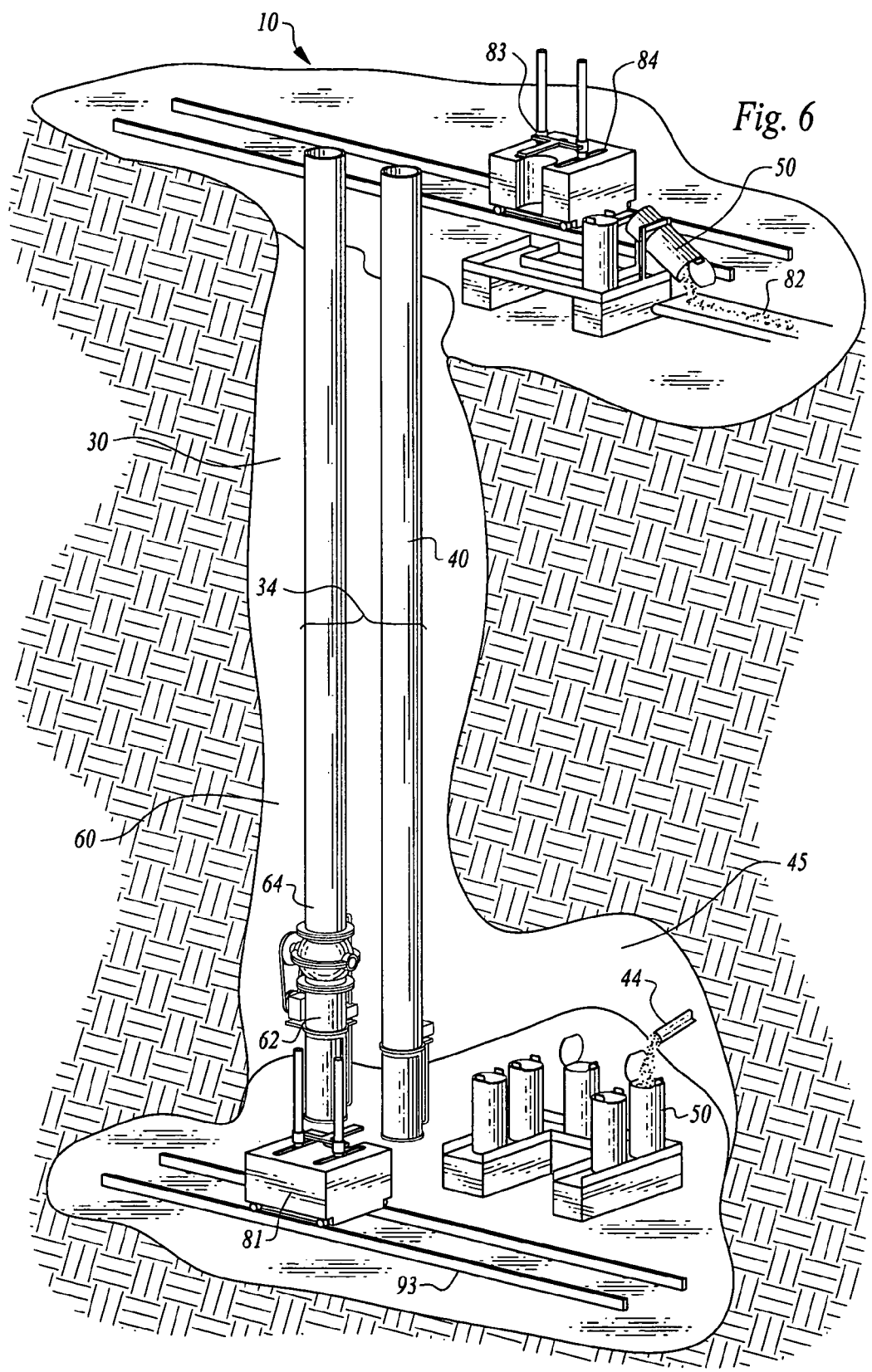
FIG. 6 depicts a perspective view of the apparatus of the present invention showing a multiple chamber single shaft structure including a dual cavity structure.

As shown in FIGS. 5 and 6, return chamber (40) may be operatively engaged with a conveyor mechanism, by which transport container (50) is removed from return chamber (40), loaded with objects, and placed within delivery chamber (60) for further transport. More specifically, transport channel (44) funnels material to an open transport container (50) while lower shuttle tram (81) cycles between return chamber (40) and delivery chamber (60), alternatively transporting and retrieving consecutive transport containers (50). A second upper shuttle tram (84) may be positioned at a higher elevation for dispensing the contents of transport container (50) onto a conveyor (82).

Figure 7:
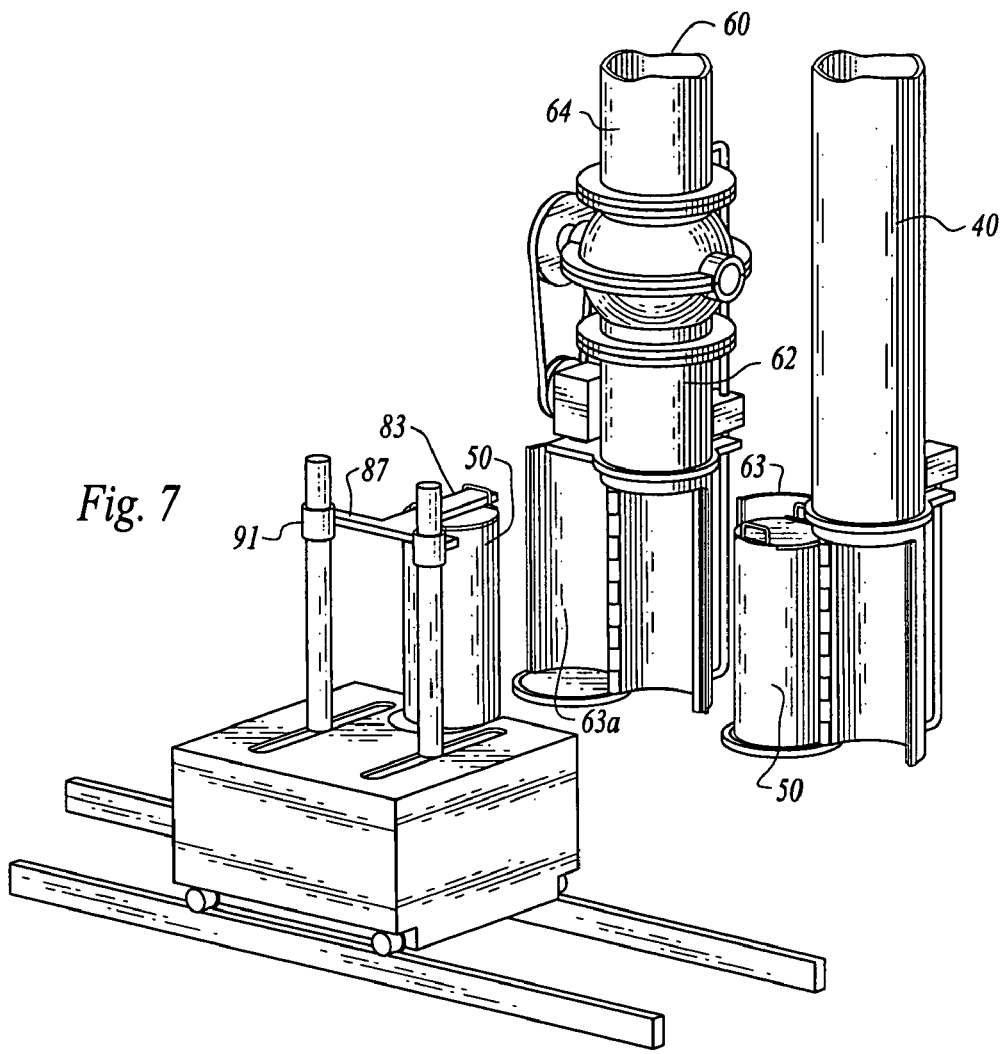
FIG. 7 depicts lateral movement of a transport container for loading or unloading according to the apparatus of the present invention.
Figure 8:
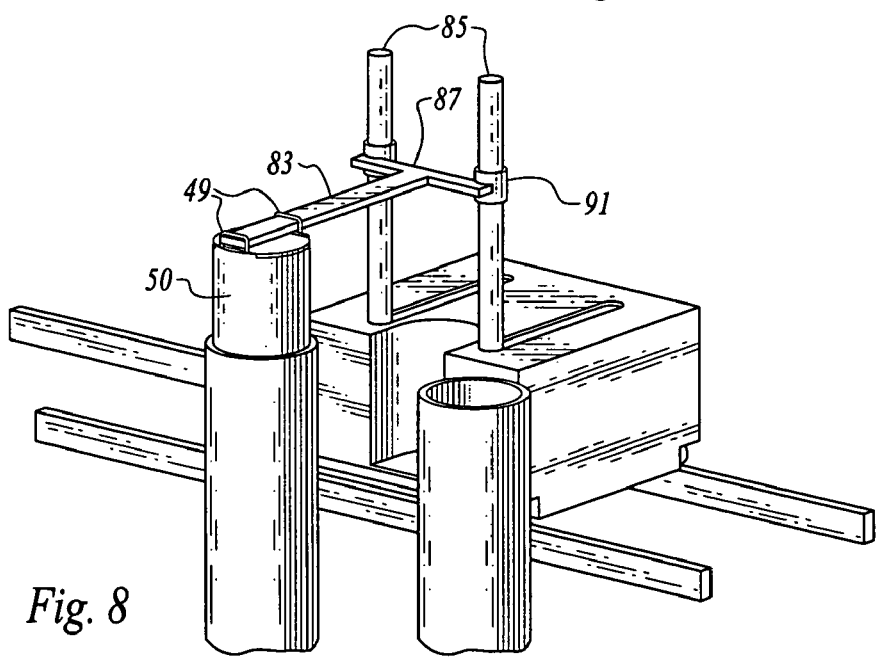
FIG. 8 depicts displacement of a transport container for loading or unloading according to the apparatus of the present invention.
Figure 12:
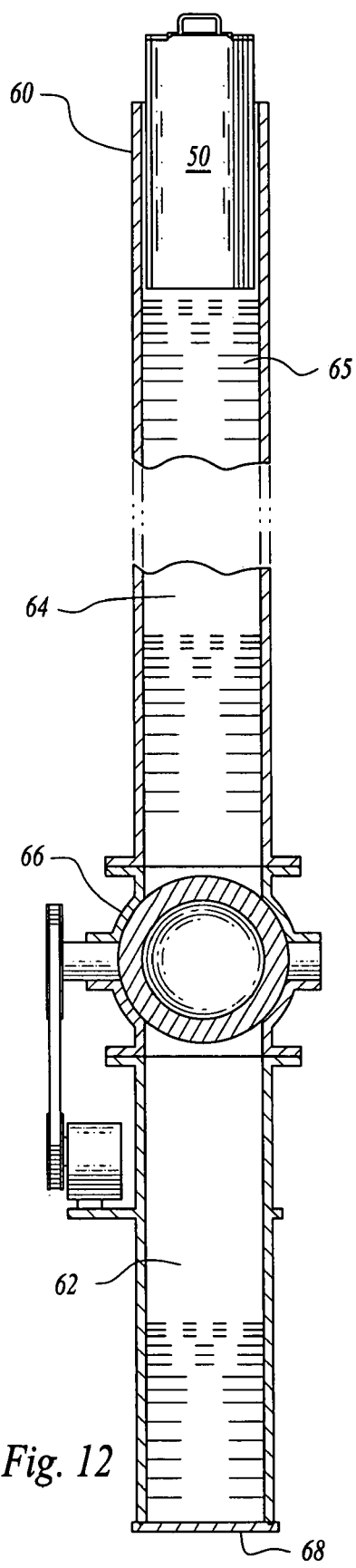
FIG. 12 depicts a front full cross-section of a delivery chamber, showing a valve in a closed position, water in a lower chamber section, and a transport container at the top of the delivery chamber, according to the apparatus of the present invention.

As depicted in FIGS. 7 and 8, it is preferred that a tine (83) engage within at least one inverted U-shaped handle operatively coupled to transport container (50) to facilitate movement of transport container (50).

FIG. 8 reflects that tine (83) preferably engages a pair of U-shaped handles (49) diametrically disposed in alignment on a transport container (50) extremity. Transport container (50) is skewered by tine (83) when lower shuttle tram (81) or upper shuttle tram (84) advances in diametric alignment to handles (49). Each shuttle tram has at least one (and preferably two) tine support posts (85) supporting tine (83) via an interconnecting cross piece (87). Tine support posts (85) are constrained within slots (91) and reciprocate to selectively engage handles (49) via tine (83). In this manner, transport containers (50) can be cycled.

As depicted in FIGS. 5 and 6, lower shuttle tram (81) moves transport container (50) from station (45) operatively situated in conjunction with transport channel (44) into position for placement into delivery chamber (60). As depicted in FIG. 7, return chamber (40) may be constructed with an opening portion (63) to release transport container (50), and delivery chamber (60) may be constructed with an opening portion (63a) to receive transport container (50). Opening portions (63) and (63a) may be contoured to envelop transport container (50).

FIG. 9 reflects an alternative technique for delivering transport container (50) to address delivery chamber (60). A belt type conveyor (67) supports each transport container (50) via an interposed extensible ram (67a), which emanates from a housing (67b) supported by, and preferably integrated with, conveyor (67). Transport container (50) is guided into delivery chamber (60) by conveyor (67) and ram (67a) or a similar device for vertically elevating and positioning transport container (50) within delivery chamber (60). Ram (67a) may comprise jacks, screws or hydraulic means to move transport container (50) into delivery chamber (60).

Prior to flotation within delivery chamber (60), transport container (50) may be secured within lower chamber section (62) of delivery chamber (60) by a locking mechanism (not shown). Once transport container (50) floats to the surface through delivery chamber (60), a locking device such as that depicted in FIG. (9a) may be employed to stabilize transport container (50) for removal by upper shuttle tram (84).

As shown in FIGS. 10-13, delivery chamber (60) is constructed with a lower chamber section (62), an upper chamber section (64), and a fluid control valve (66). Lower chamber section (62) may be constructed with a lower chamber hatch (68), which alternatively seals or unseals lower chamber section (62) to control ingress into, and egress from, delivery chamber (60) during operation as more fully explained below. Upper chamber section (64) is constructed with an upper chamber hatch (not shown), which in its closed position seals upper chamber section (64) during the flotation process, and in its opened position permits transport container (50) to exit delivery chamber (60) as more fully set forth below.

As also shown in FIGS. 10-13, fluid control valve (66) is operatively situated within and internally connected to delivery chamber (60), between lower chamber section (62) and upper chamber section (64). Fluid control valve (66) may be constructed from an array of materials, such as plastic, any suitable metal, composite, ceramic or reinforced resin synthetic, keeping in mind durability and an unobstructed through passage during use. Fluid control valve (66) controls fluid flow within delivery chamber (60), and is depicted as a ball valve having a turning stem operatively coupled to a pulley, which is rotationally driven via a motor and belt extending between the pulley and a complemental sheave on the motor. A variety of valve types may be employed in the present invention, such as gate valves and the like, so long as the valve structure does not improperly obstruct fluid or transport container flow through delivery chamber (60).

Figure 14:
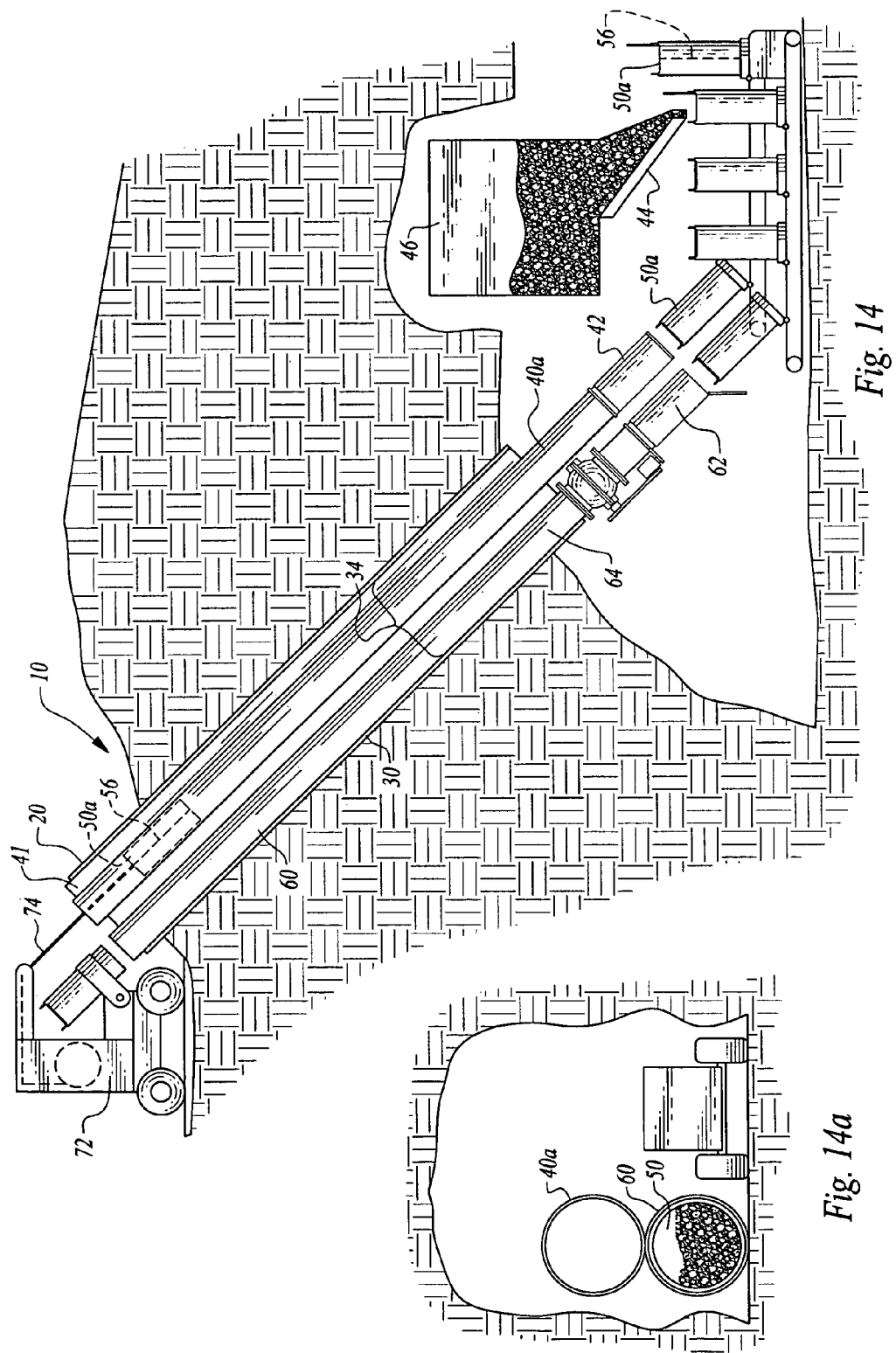
FIG. 14 depicts a side view of an incline elevation of the third embodiment of the apparatus of the present invention showing a multiple chamber single shaft structure including a dual cavity structure.

FIG. 14 shows the third embodiment of elevation apparatus (10) of the present invention in an incline lifting orientation. Shaft elevation structure (20) is situated in a sloped orientation to facilitate transporting objects at an angle within chamber framework (30) on a graded incline, as opposed to in a vertical orientation. Chamber framework (30) includes a dual cavity structure (34) including return chamber (40a), delivery chamber (60), and transport container (50a) in operative communication with chamber framework (30). Return chamber (40a) includes a lower section (42) constructed and disposed to facilitate operative communication of transport container (50a) with transport channel (44) and bin (46), and additionally includes a laterally disposed ventilation channel (41), to permit air circulation within return chamber (40a) simultaneously with movement of transport container (50a) within return chamber (40a). In an alternative embodiment of the present invention (not shown), transport container (50a) may be loaded with material via transport channel (44) and bin (46) while transport container (50a) remains within return chamber (40a).

Transport container (50a) includes an internally disposed partition (56) to maintain transported materials or objects along the lower longitudinal portion of transport container (50a), and thereby diminish contact between the outer surface of transport container (50a) and the inner surface wall of delivery chamber (60) during elevation of transport container (50a) within delivery chamber (60).

In a fourth embodiment, the elevation apparatus (10) is as described with respect to the third embodiment, but includes the tripartite cavity structure described above.

Figure 15:
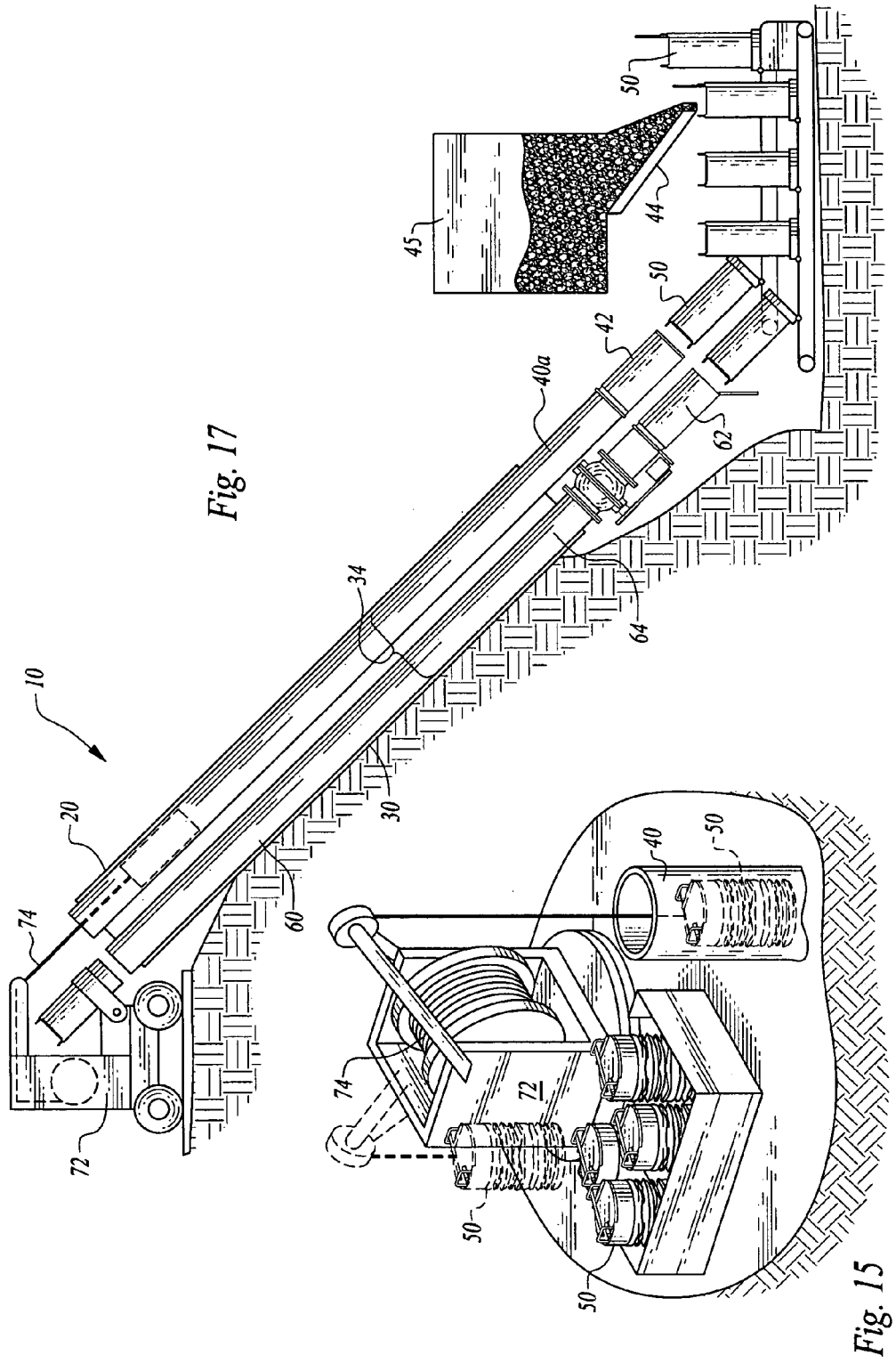
FIG. 15 depicts a perspective view of multiple transport containers and a hoist of the apparatus of the present invention for lowering transport containers within a chamber.

FIG. 15 depicts a preferred mechanism that may be employed in the present invention to lower transport containers (50) within delivery chamber (40). Multiple collapsed transport containers (50) are shown in a bucket, skip or other such container. Multiple transport containers (50) may be lowered within return chamber (40) simultaneously, or transport containers (50) may be lowered within return chamber (40) individually.

Figure 16:
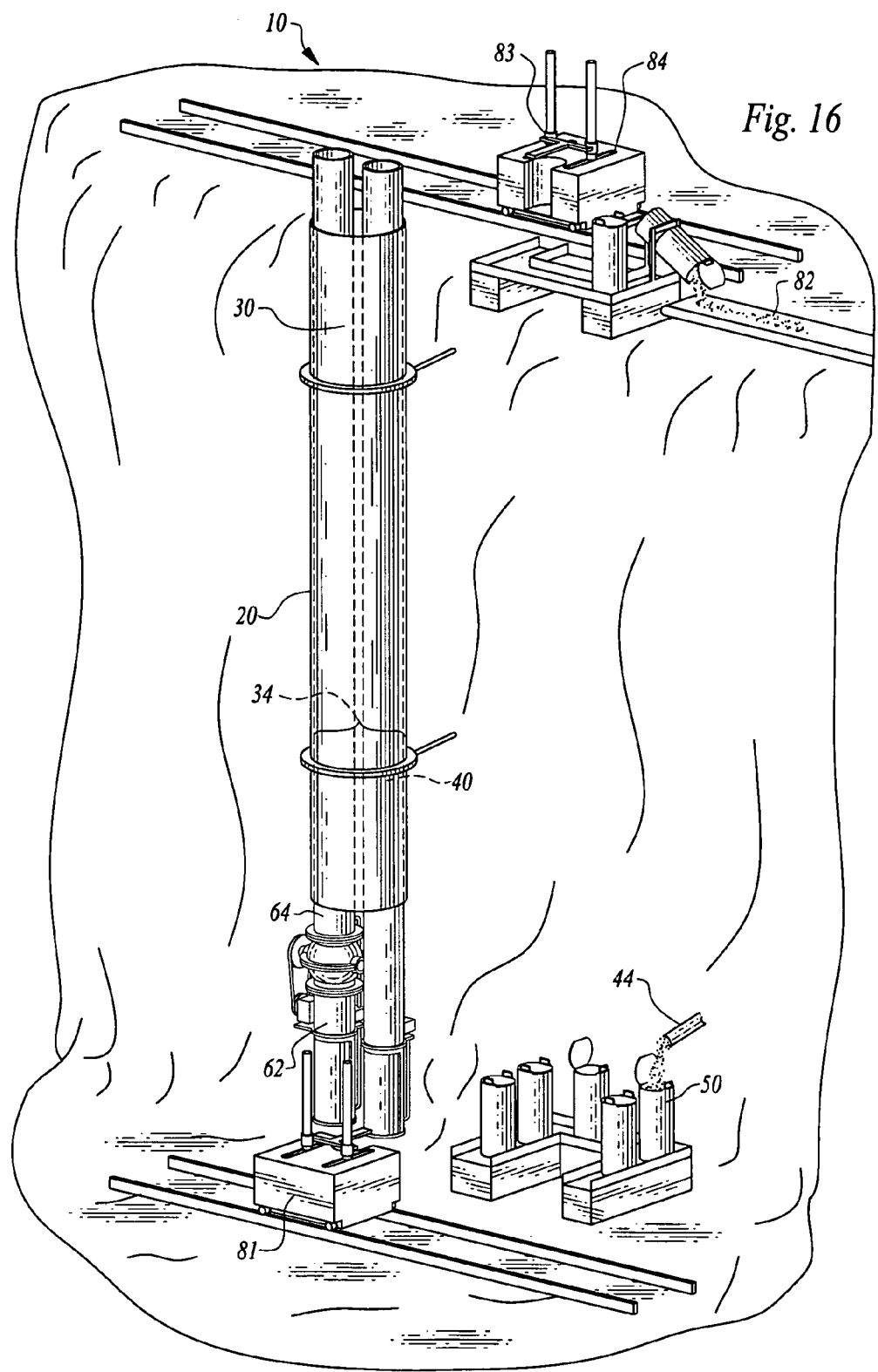
FIG. 16 depicts a perspective view of the second embodiment of the apparatus of the present invention in an above-ground vertical environment.

FIGS. 16 and 17 depict embodiments of the present invention wherein elevation apparatus (10) of the present invention is employed above ground in a vertical orientation (FIG. 16) or in an angled orientation (FIG. 17). Elevation apparatus (10) may be positioned above ground, such as over a mountain pass or other such environmental elevation, to facilitate lifting objects over or beyond such environmental elevations. For instance, transport container (50) may be elevated within chamber framework (30) from a valley floor, above the surface of the ground, to a pass in a mountain range. Under such circumstances, often an elevated fluid source (e.g. water) exists on the flanks of the pass where water can be applied to replace the small amount of water released when transport container (50) is introduced on the valley floor. Preferably, at the lower end of elevation apparatus (10) in an above ground environment, pumping excess or standing fluid may not be necessary since such fluid may be released into a natural drainage location.

In a similar fashion, elevation apparatus (10) may be employed above ground along a vertical cliff or the side of a building or other standing structure to transport objects above ground within elevation apparatus (10). The structural and operational components for elevation apparatus (10) situated above ground, as opposed to beneath the earth's surface, are substantially similar to the components described above in detail in conjunction with the previous embodiments. However, as depicted in FIGS. 16 and 17, the journey of transport container (50) begins above ground and ends above ground.

In operation, elevation apparatus (10) of the present invention elevates animate or inanimate objects within chamber framework (30) from beneath the earth's surface or from one elevation above the earth's surface to another elevation, including rocks, rock fragments, related mining materials, mining and operational equipment. Elevation apparatus (10) may be employed to elevate human beings, such as mining personnel, and other animate objects from beneath the earth's surface or above the earth's surface. For instance, elevation apparatus (10) may be used as a means of egress to remove personnel from beneath the earth's surface in a mining emergency situation where a power outage occurs, or under circumstances where limited space becomes available to achieve egress from a mine or other such underground location.

Subsurface or above surface inanimate or animate objects are elevated within an essentially airtight transport container (50), which moves within chamber framework (30) constructed within shaft elevation structure (20). Transport container (50) may be filled with materials from bin (46), such as rock, rock fragments or any number of inanimate objects requiring transport. Transport container (50) is filled with material in a manner such that the density of transport container (50) containing material is less than the density of fluid (65) in fluid filled deliver chamber (60) in order to generate sufficient buoyancy to elevate transport container (50) and its contents within chamber framework (30). Typically, the composition and geometry of transport container (50) takes into account the density of the material transported. Where extraordinarily dense material is being transported, the container may have some buoyancy either integrated into the structure or separately available, of varying sizes and separately deployable as a function of the material's specific gravity vis-à-vis the fluid (65) specific gravity, and transport container (50) and its buoyancy modifiers. Buoyancy modifiers may append an exterior of transport container (50) or be placed interiorly.

After transport container (50) is filled with material from bin (46) through transport channel (44), transport container (50) is sealed and guided into lower chamber section (62) of delivery chamber (60). Lower chamber section (62) is positioned below fluid control valve (66) within delivery chamber (60). Transport container (50) is guided into lower chamber section (62) by a positioning device, such as a lateral conveyor (67), a ram (67a), a shuttle tram (81) or other such positioning devices designed to secure and mobilize objects from one location to an alternate location. Transport container (50) is then held in place within lower chamber section (62) by a locking device (not shown) securely attached near the bottom portion of lower chamber section (62).

Figure 13:
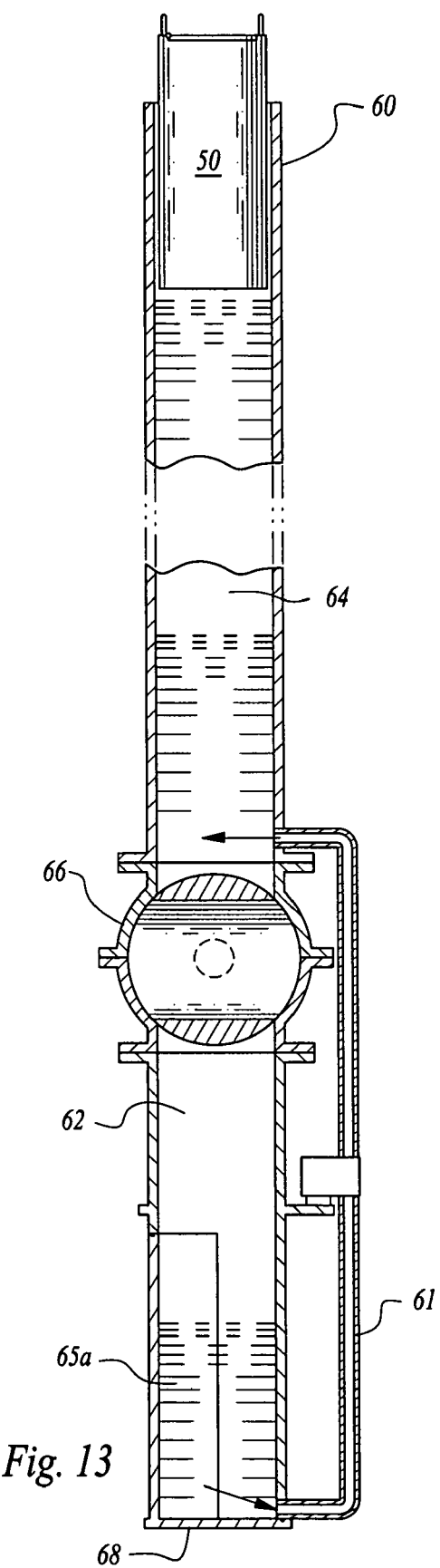
FIG. 13 depicts a side full cross-section of a delivery chamber, showing a valve in a closed position and water being transferred to an upper chamber section, according to the apparatus of the present invention.

With filled transport container (50) securely stationed within lower chamber section (62) of deliver chamber (60), lower chamber hatch (68) is then closed and fluid control valve (66) is opened, which allows fluid to enter into lower chamber section (62) from upper chamber section (64) until transport container (50) floats above fluid control valve (66). When transport container (50) floats upwardly past fluid control valve (66), fluid control valve (66) is then closed, and lower chamber hatch (68) is opened to release any residual amount of fluid (65a) remaining in lower chamber section (62). Fluid replacement within upper chamber section (64) of delivery chamber (60) may or may not be necessary, depending upon fluid availability at a particular site or in a particular environment. If necessary, replacement fluid may be added through the top opening of upper chamber section (64) of delivery chamber (60) by pumping or other available fluid transport devices. As depicted in FIG. 13, residual fluid (65a) may alternatively be re-circulated from lower chamber section (62) into upper chamber section (64) by re-circulation pipe (61) in order to replenish fluid within upper chamber section (64) of delivery chamber (60).

Residual fluid (65a) remaining in lower chamber section (62) of delivery chamber (60) flows away from shaft elevation structure (20) or may be removed by fluid pumping equipment (not shown). Alternatively, lower chamber hatch (68) of lower chamber section (62) may operatively communicate with an externally disposed drain facility (not shown), which would obviate the need for pumping residual fluid (65a). In a variation of the present invention (not shown), delivery chamber (60) may itself be used as a conduit for pumping fluid upward within chamber framework (30), with or without transport container (50) present, particularly in circumstances where a drainage area is not available for residual fluid (65a).

When elevation apparatus (10) is positioned above ground, such as over a mountain pass with a fluid source higher on one flank of the pass, fluid may be fed from the high flank into upper chamber section (64) of delivery chamber (60), and subsequently released onto the valley floor when lower chamber hatch (68) of lower chamber section (62) of delivery chamber (60) is opened.

After transport container (50) floats to the top of upper chamber (64) of delivery chamber (60), transport container (50) may be connected to upper shuttle tram (84), which guides transport container (50) to a stockpile (82) or other such desirable surface location at which the contents of transport container (50) are released. Upper shuttle tram (84) releases the contents of transport container (50), and may employ at least one tine as previously described with respect to lower shuttle tram (81), whereupon a pincer type arm girds transport container (50) for hoisting, inversion, and disgorgement of transport container (50) contents. As an alternative to employing a shuttle tram (84) to position transport container (50) for dumping or otherwise releasing its contents onto stockpile (82) or other desired surface location, a tipple system (not shown) may be employed to position transport container (50) for emptying.

After its contents are emptied, transport container (50) is then guided toward and lowered into return chamber (40) to retrieve or deliver another load of materials or objects or to repeat the cycle described above. Transport container (50) may descend within return chamber (40) with transport container (50) either empty, filled with material to transport within chamber framework (30), or in a collapsed form. Transport containers (50) may be transported within return chamber (40) by a hoist, or haulage vehicle, or other such mechanism for controlling the decent velocity of transport containers (50) within return chamber (40). Several collapsed transport containers (50) may be placed in a bucket, skip, cage, or similar housing and lowered within return chamber (40) simultaneously, or transport containers (50) may be lowered within return chamber (40) one at a time. Alternatively, the descent velocity of transport container (50) within return chamber (40) may be modulated by an air compression device (not shown) operatively attached to shaft elevation structure (20) or an internally disposed braking system (not shown).

An auxiliary surface hoist (72) is depicted in FIG. 1 in conjunction with auxiliary hoist chamber (70) and may be employed as an emergency, maintenance, personnel or otherwise alternative elevation device for ingress or egress of animate or inanimate objects within chamber framework (30). Alternatively, delivery chamber (60) and transport container (50) of shaft elevation structure (20) may be employed to elevate personnel and other animate objects within chamber framework (30) in various circumstances, including mining emergencies, power failures and the like.

In an incline elevation environment, elevation shaft structure (20), and chamber framework (30) operate in essentially the same fashion as described above. As depicted in FIG. 14, chamber framework (30) includes a dual cavity structure (34), incorporating return chamber (40a) and fluid filled deliver chamber (60). Return chamber (40a) is depicted incorporating a laterally and adjacently disposed ventilation channel (41), which facilitates ventilation within return chamber (40a) simultaneously with the movement of transport container (50a) within return chamber (40a). An alternative to employing return chamber (40a) for returning transport containers (50a) back within chamber framework (30) is use of truck haulage units to return transport containers (50a) within chamber framework (30) for loading or unloading.

Transport container (50a) includes an internally disposed partition (56), which maintains rock or other transported material on the lower longitudinal portion of transport container (50a) as transport container (50a) is elevated at an incline angle within delivery chamber (60). Partitioning transported material to remain along the lower longitudinal portion of transport container (50a) helps to minimize contact between the outer surface of transport container (50a) and the inner surface wall of delivery chamber (60) as transport container (50a) is elevated within delivery chamber (60) at an angle. Preferably, the angle of elevation should be greater than 20 degrees and preferably 45 degrees, plus or minus 15 degrees.

Having thus described the invention, it should be apparent that numerous structural modifications and adaptations may be resorted to without departing from the scope of the present invention as set forth herein and as defined by the claims.

I claim:

1. An apparatus comprising:
    at least one shaft structure comprising a delivery chamber for transporting animate or inanimate objects employing flotation elevation;
    a transport container;
    a fluid internally disposed within said delivery chamber for elevating said transport container within said delivery chamber by flotation;
    a return chamber for lowering said transport container through said at least one shaft structure, and a loader for loading objects into said transport container; and
    an auxiliary chamber laterally disposed to said delivery chamber or said return chamber for transporting objects within said at least one shaft structure.

2. The apparatus of claim 1 wherein said return chamber comprises a vertically disposed cavity within said at least one shaft structure through which said transport container descends in order to deliver or retrieve objects.

3. The apparatus of claim 1 wherein said loader is operatively engaged with said return chamber and comprises an object storage and a channel configured to transfer objects from said storage through said channel into said transport container.

4. The apparatus of claim 1, further comprising a delivery device comprising a cavity laterally disposed to said return chamber within said at least one shaft structure, wherein said delivery device is configured to receive said transport container from said return chamber and wherein said delivery device is equipped to facilitate elevation of said transport container into the delivery chamber.

5. The apparatus of claim 4, wherein said delivery device further comprises a fluid controller configured to control the amount of fluid in the delivery chamber to elevate said transport container within said delivery chamber of said at least one shaft structure.

6. The apparatus of claim 1, wherein said transport container comprises a moveable lid configured to seal said transport container.

7. The apparatus of claim 1, further comprising a conveyer; and a fluid controller internally disposed within said delivery chamber and configured to control the volume of fluid within said delivery chamber to elevate objects contained in said transport container.

8. The apparatus according to claim 7, further comprising a loader configured to load objects into said transport container, and a guiding device configured to guide said transport container.

9. The apparatus according to claim 8, wherein said guiding device is horizontally disposed within a bottom portion of a conveyor in operative communication with said return chamber, said transport container, and said delivery chamber.

10. The apparatus according to claim 8, wherein said fluid controller comprises a lower chamber internally disposed within said delivery chamber, and a valve configured to control the amount of said fluid in said lower chamber.

11. The apparatus according to claim 1 wherein said return chamber is configured to adjust the speed at which said transport container descends within said return chamber.

12. The apparatus according to claim 11, wherein said delivery chamber comprises a device configured to engage said transport container and to control the amount of said fluid within said delivery chamber to achieve sufficient buoyancy to float said transport container upward within said delivery chamber.

13. An apparatus comprising:
    a delivery chamber for transporting animate or inanimate objects employing flotation elevation;
    a transport container;
    a fluid internally disposed within said delivery chamber for elevating said transport container within said delivery chamber by flotation;
    a return chamber for lowering said transport container, and a loader for loading objects into said transport container; and
    an auxiliary chamber laterally disposed to said delivery chamber or said return chamber.

14. The apparatus of claim 13 wherein said return chamber comprises a vertically disposed cavity.

15. The apparatus of claim 13 wherein said loader is operatively engaged with said return chamber and comprises an object storage and a channel configured to transfer objects from said storage through said channel into said transport container.

16. The apparatus of claim 13, further comprising a delivery device comprising a cavity laterally disposed to said return chamber, wherein said delivery device is configured to receive said transport container from said return chamber and wherein said delivery device is equipped to facilitate elevation of said transport container into the delivery chamber.

17. The apparatus of claim 16, wherein said delivery device further comprises a fluid controller configured to control the amount of fluid in the delivery chamber to elevate said transport container within said delivery chamber.

18. The apparatus of claim 13, wherein said transport container comprises a moveable lid configured to seal said transport container.

19. The apparatus of claim 13, further comprising a conveyer; and a fluid controller internally disposed within said delivery chamber and configured to control the volume of fluid within said delivery chamber to elevate objects contained in said transport container.

20. The apparatus according to claim 19, further comprising a loader configured to load objects into said transport container, and a guiding device configured to guide said transport container.

21. The apparatus according to claim 20, wherein said guiding device is horizontally disposed within a bottom portion of a conveyor in operative communication with said return chamber, said transport container, and said delivery chamber.

22. The apparatus according to claim 20, wherein said fluid controller comprises a lower chamber internally disposed within said delivery chamber, and a valve configured to control the amount of said fluid in said lower chamber.

23. The apparatus according to claim 13 wherein said return chamber is configured to adjust the speed at which said transport container descends within said return chamber.

24. The apparatus according to claim 23, wherein said delivery chamber comprises a device configured to engage said transport container and to control the amount of said fluid within said delivery chamber to achieve sufficient buoyancy to float said transport container upward within said delivery chamber.

* * * * *